(12) United States Patent
Chagam Reddy

(10) Patent No.: US 11,093,311 B2
(45) Date of Patent: Aug. 17, 2021

(54) TECHNOLOGIES FOR MONITORING NODE CLUSTER HEALTH

(71) Applicant: INTEL CORPORATION, Santa Clara, CA (US)

(72) Inventor: Anjaneya Reddy Chagam Reddy, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 54 days.

(21) Appl. No.: 16/344,576

(22) PCT Filed: Nov. 29, 2017

(86) PCT No.: PCT/US2017/063783
§ 371 (c)(1),
(2) Date: Apr. 24, 2019

(87) PCT Pub. No.: WO2018/102456
PCT Pub. Date: Jun. 7, 2018

(65) Prior Publication Data
US 2020/0210261 A1  Jul. 2, 2020

Related U.S. Application Data

(60) Provisional application No. 62/427,268, filed on Nov. 29, 2016, provisional application No. 62/584,401, filed on Nov. 10, 2017.

(30) Foreign Application Priority Data

Aug. 30, 2017  (IN) .............................. 201741030632

(51) Int. Cl.
*G06F 11/00* (2006.01)
*G06F 11/07* (2006.01)
(Continued)

(52) U.S. Cl.
CPC ........ *G06F 11/0709* (2013.01); *G06F 11/079* (2013.01); *G06F 11/0751* (2013.01);
(Continued)

(58) Field of Classification Search
CPC ............. G06F 11/0709; G06F 11/0751; G06F 11/0793
See application file for complete search history.

(56) References Cited

U.S. PATENT DOCUMENTS 8,516,089 B2 * 8/2013 Johnsen .................. G06F 11/30
709/221
10,010,008 B2 * 6/2018 Hughes ................ H05K 7/1487
(Continued)

FOREIGN PATENT DOCUMENTS

KR  10-2005-0068326  7/2005
KR  10-2008-0051040  6/2008

OTHER PUBLICATIONS

PCT Search Report and Written Opinion prepared for PCT/US2017/063783, completed Mar. 14, 2018.

*Primary Examiner* — Michael Maskulinski
(74) *Attorney, Agent, or Firm* — Compass IP Law PC

(57) ABSTRACT

Technologies for monitoring node cluster health include a plurality of managed nodes of anode cluster communicatively coupled across a data network to a resource manager server. The resource manager server is configured to receive health data, via an out-of-band network, from each of the managed nodes of the node cluster. The resource manager server is further configured to identify whether a managed node of the plurality of managed nodes has indicated a failure, determine a cause of the failure, and classify the failure as being one of a soft failure or a hard failure as a function of the received health data and the cause of the failure. Additionally, the resource manager server is configured to transmit a health state change event to each of the
(Continued)

other managed nodes of the plurality of managed nodes of the node cluster. Other embodiments are described herein.

27 Claims, 17 Drawing Sheets

(51) Int. Cl.
*G06F 11/30* (2006.01)
*H05K 7/14* (2006.01)
*G06F 9/50* (2006.01)
*G06F 11/34* (2006.01)
*H04Q 11/00* (2006.01)
*G06F 16/28* (2019.01)

(52) U.S. Cl.
CPC ...... *G06F 11/3006* (2013.01); *G06F 11/3055* (2013.01); *H05K 7/1487* (2013.01); *H05K 7/1491* (2013.01); *G06F 9/505* (2013.01); *G06F 9/5083* (2013.01); *G06F 11/3034* (2013.01); *G06F 11/3409* (2013.01); *G06F 16/285* (2019.01); *H04Q 11/0005* (2013.01); *H05K 7/1447* (2013.01); *H05K 7/1492* (2013.01)

(56) References Cited

U.S. PATENT DOCUMENTS

| | | | |
|---|---|---|---|
| 2006/0143602 A1* | 6/2006 | Rothman | G06F 11/0709 717/171 |
| 2008/0065928 A1 | 3/2008 | Suzuki et al. | |
| 2009/0150718 A1 | 6/2009 | Park et al. | |
| 2010/0077250 A1 | 3/2010 | Koh et al. | |
| 2012/0089778 A1 | 4/2012 | Au et al. | |
| 2012/0331119 A1* | 12/2012 | Bose | H04L 61/2015 709/223 |
| 2018/0150372 A1* | 5/2018 | Nachimuthu | G06F 9/5005 |
| 2019/0034102 A1* | 1/2019 | Miller | G06F 3/0647 |
| 2019/0068466 A1* | 2/2019 | Chagam Reddy | H04L 41/5025 |

* cited by examiner

TECHNOLOGIES FOR MONITORING NODE CLUSTER HEALTH

CROSS-REFERENCE TO RELATED APPLICATIONS

The present application is a national stage entry under 35 USC § 371(b) of International Application No. PCT/US2017/063783, filed Nov. 29, 2017 and claims the benefit of U.S. Provisional Patent Application No. 62/427,268, filed Nov. 29, 2016, Indian Provisional Patent Application No. 201741030632, filed Aug. 30, 2017, and U.S. Provisional Patent Application No. 62/584,401, filed Nov. 10, 2017.

BACKGROUND

Oftentimes, computing operations can benefit or otherwise require more computing power than a sequential computing device can provide by itself. In some architectures, that limitation may be overcome by arranging multiple compute nodes (e.g., servers) into a tightly coupled group, commonly referred to as a cluster. While each compute node of the cluster is an independent system, interconnections between the compute nodes of the cluster allows for processing operations to be performed in a parallel/distributed manner. Such clusters may be grouped based on certain characteristics (e.g., geographical areas) and leveraged to perform high performance computing operations, load balancing operations, or high availability operations, for example.

In server cluster architectures, a quorum (i.e., a minimum number of votes) may be required in order for an operation to be performed. By doing so, consistent operations can be enforced. For example, in server failover clustering, quorum can be used to understand how a cluster should remain functioning when a compute node fails, typically as a result of networking related complications. Further, during such compute failure events, the cluster membership changes and a leader election step may be triggered. Such failure events are often triggered by heartbeat failures (e.g., transport control protocol (TCP) timeouts). However, under certain conditions, real time decisions being made on the state of the cluster can be delayed when relying on heartbeat failures.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
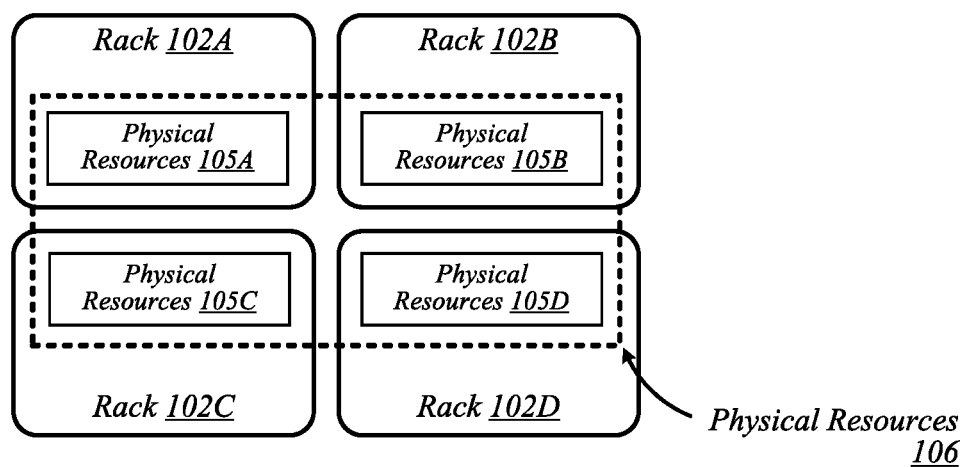
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
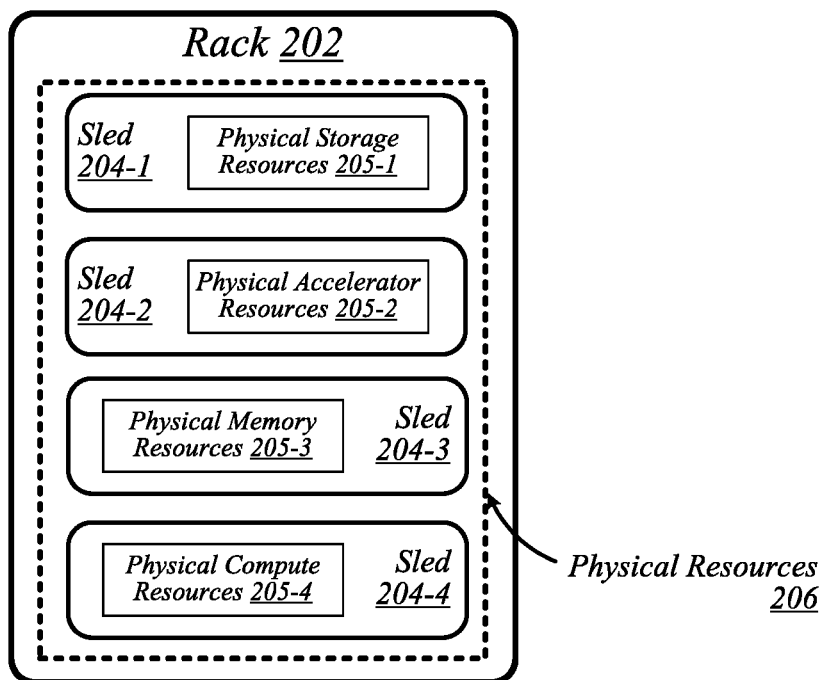
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-4 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
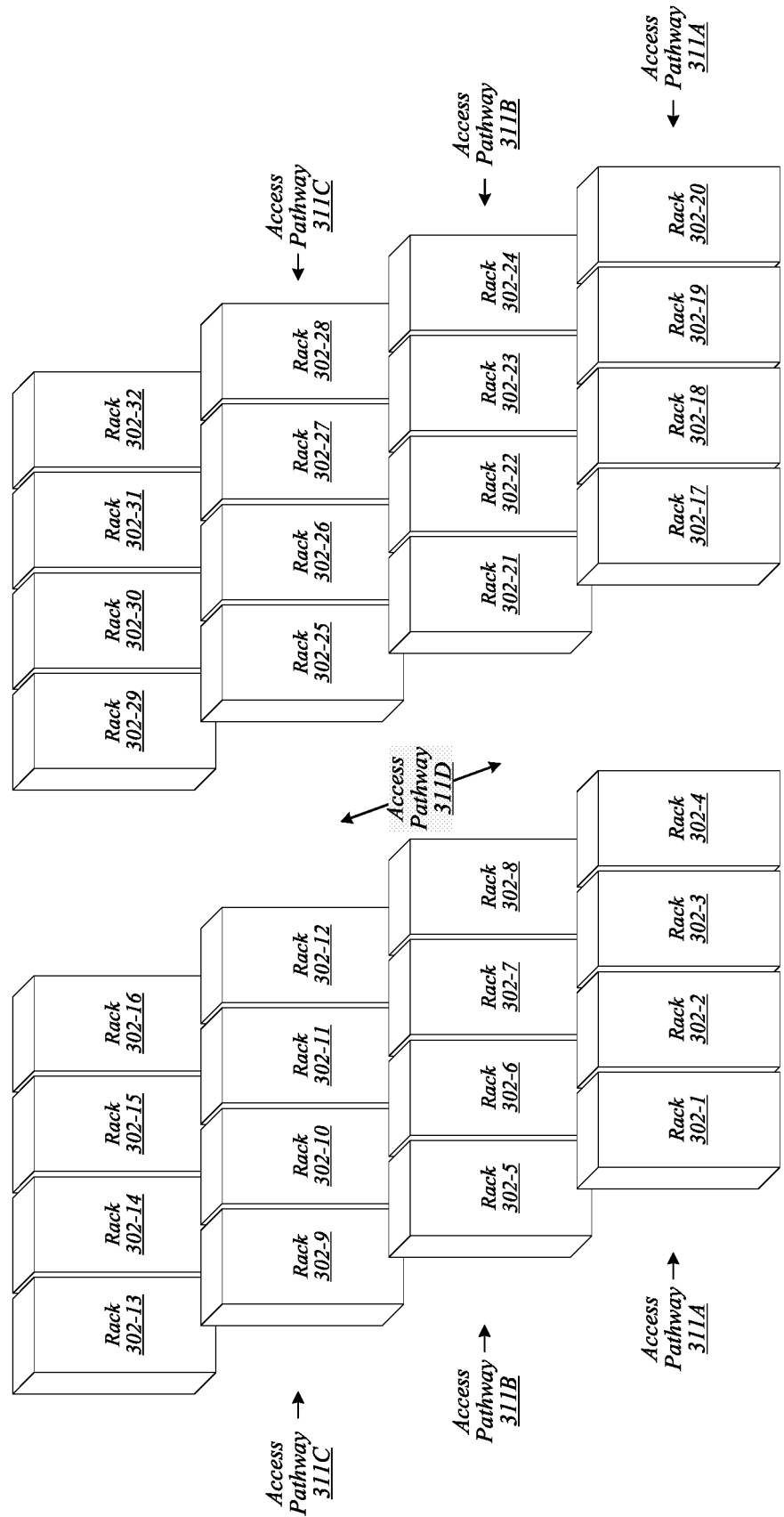
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
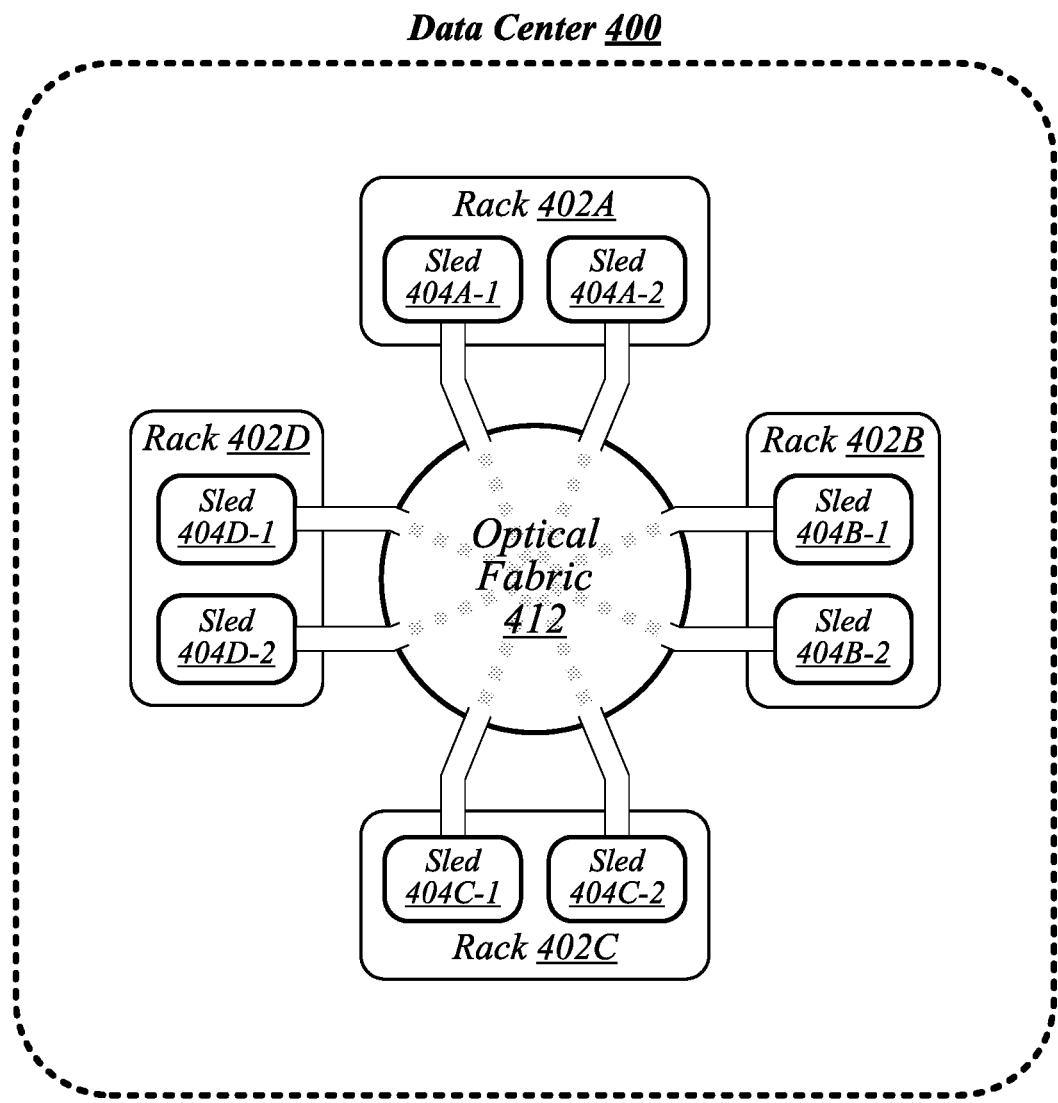
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
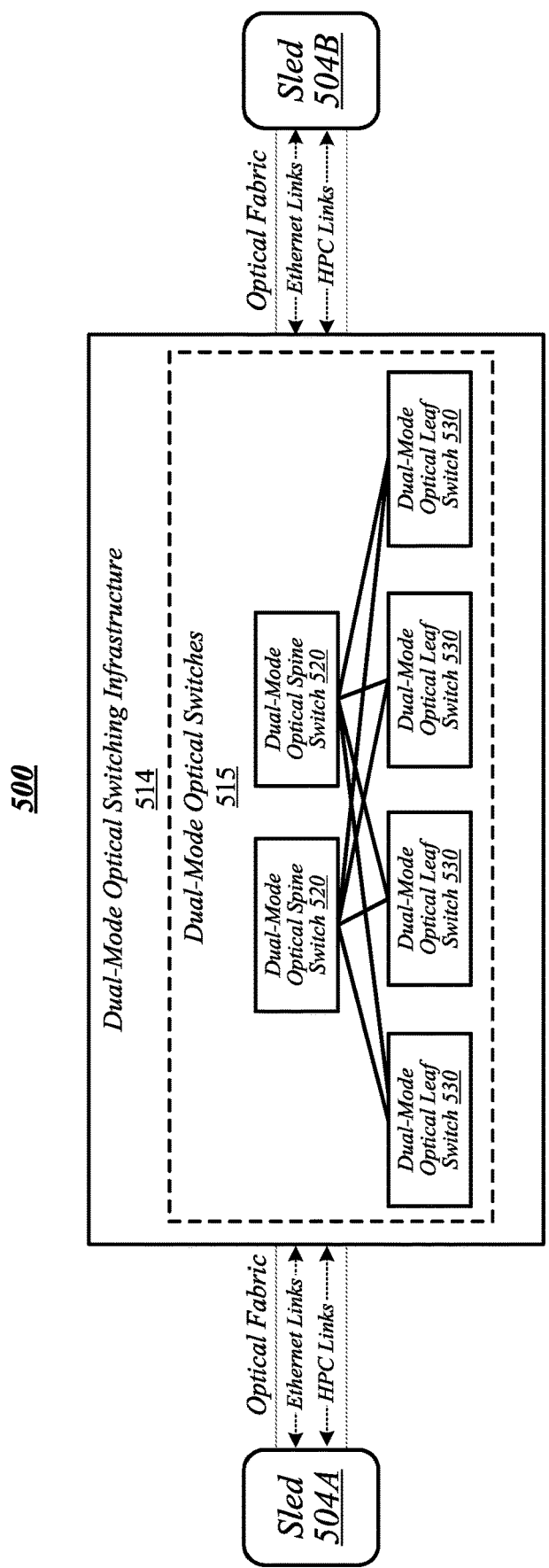
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, InfiniBand™) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
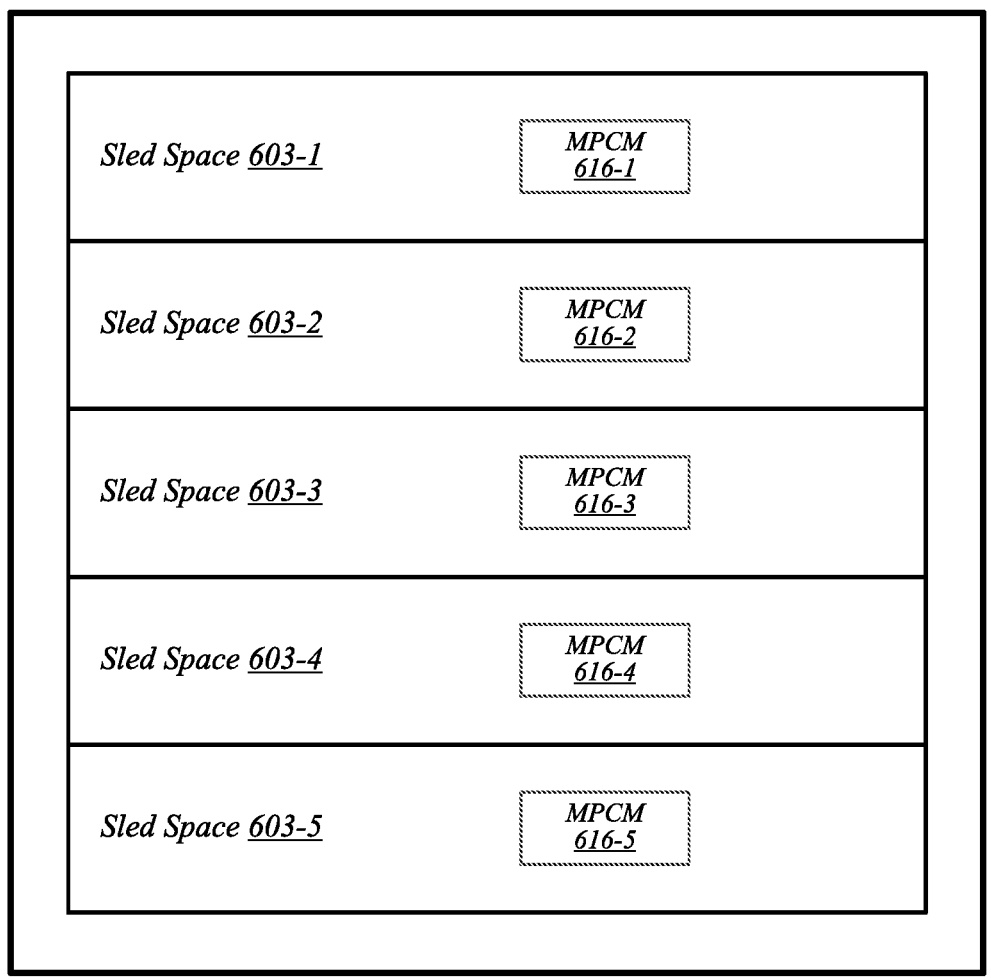
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
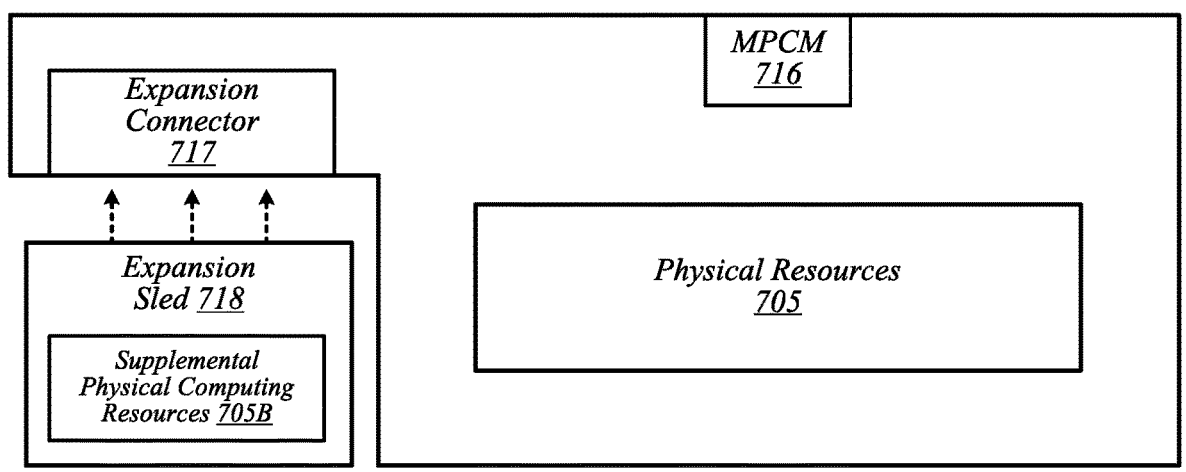
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
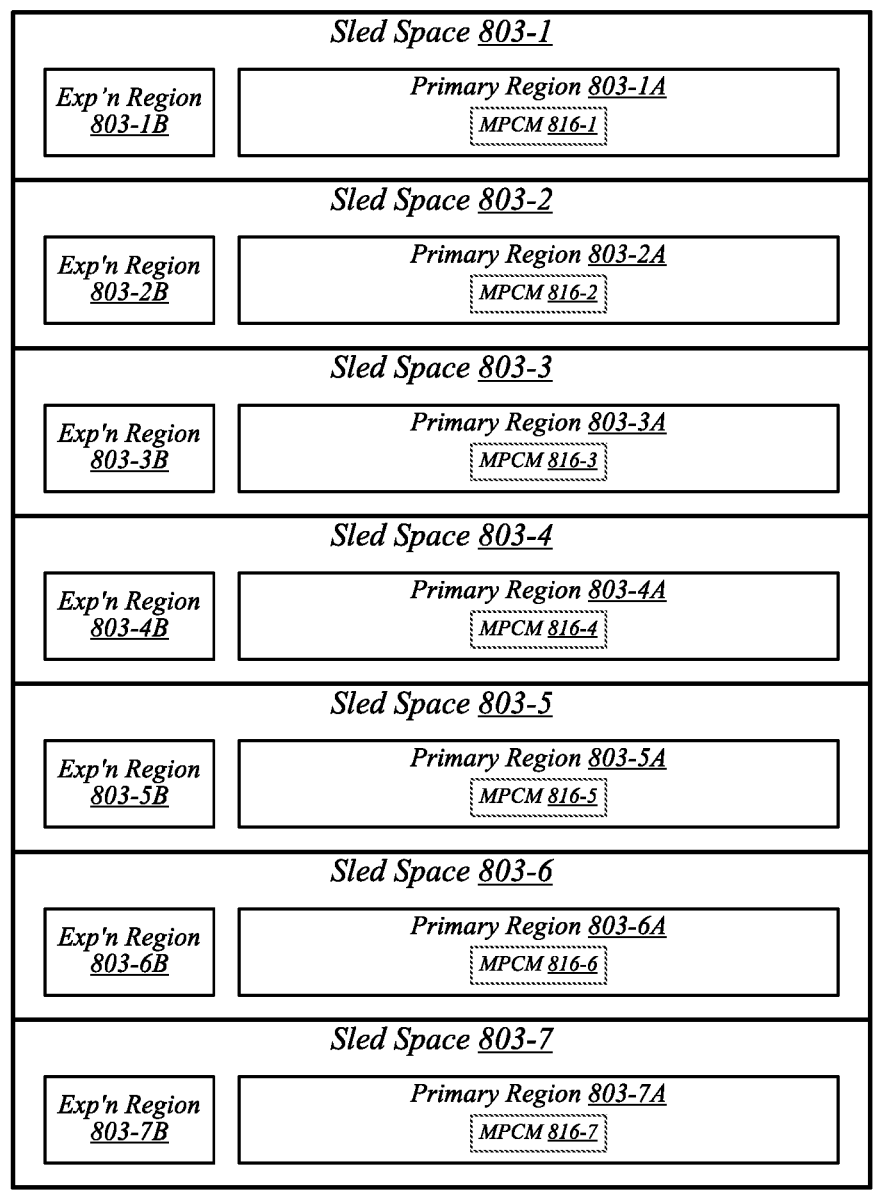
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
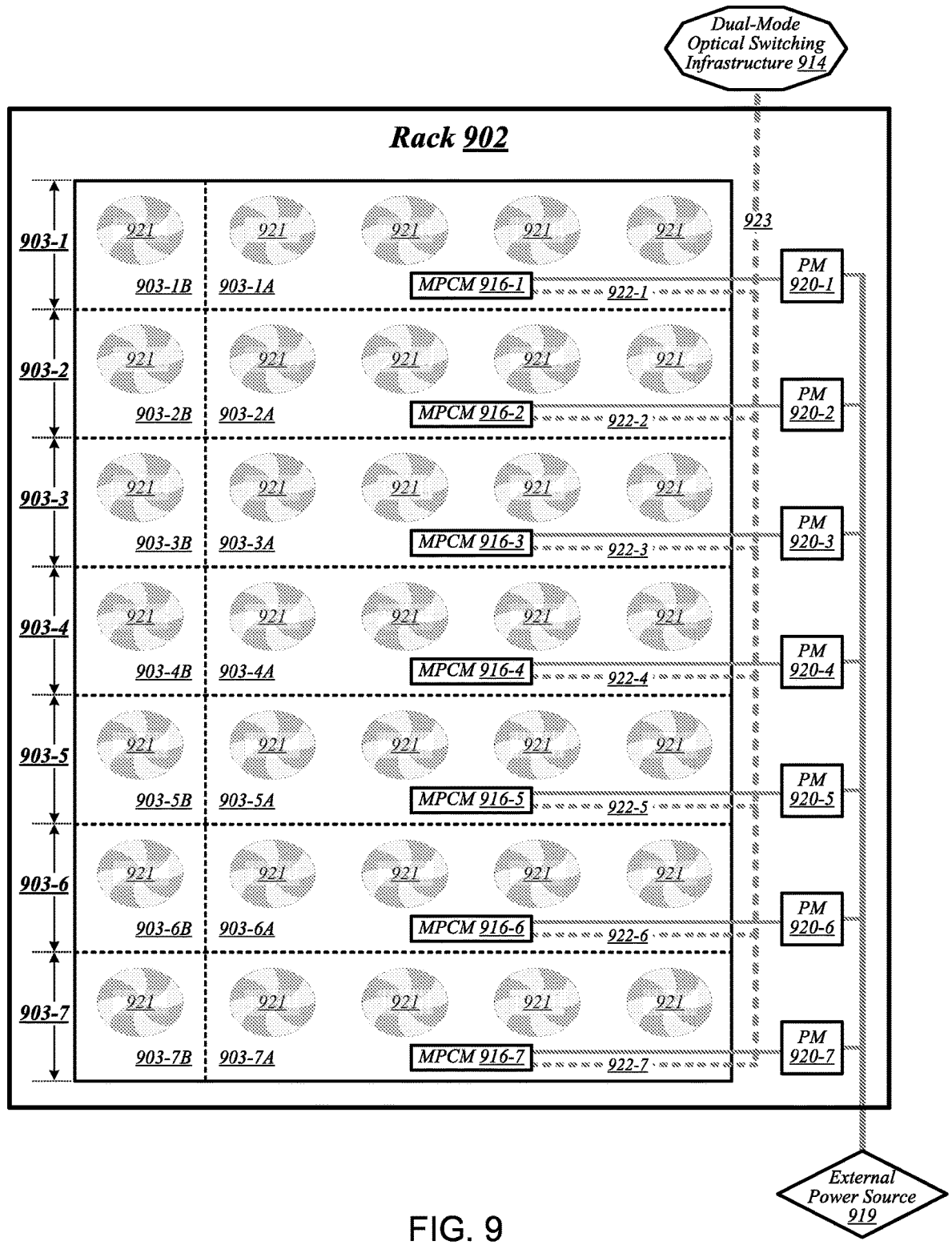
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 921 that are generally arranged to provide air cooling within the various sled spaces 903-1 to 903-7. In some embodiments, the height of the sled space is greater than the conventional "1U" server height. In such embodiments, fans 921 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 919. In various embodiments, external power source 919 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
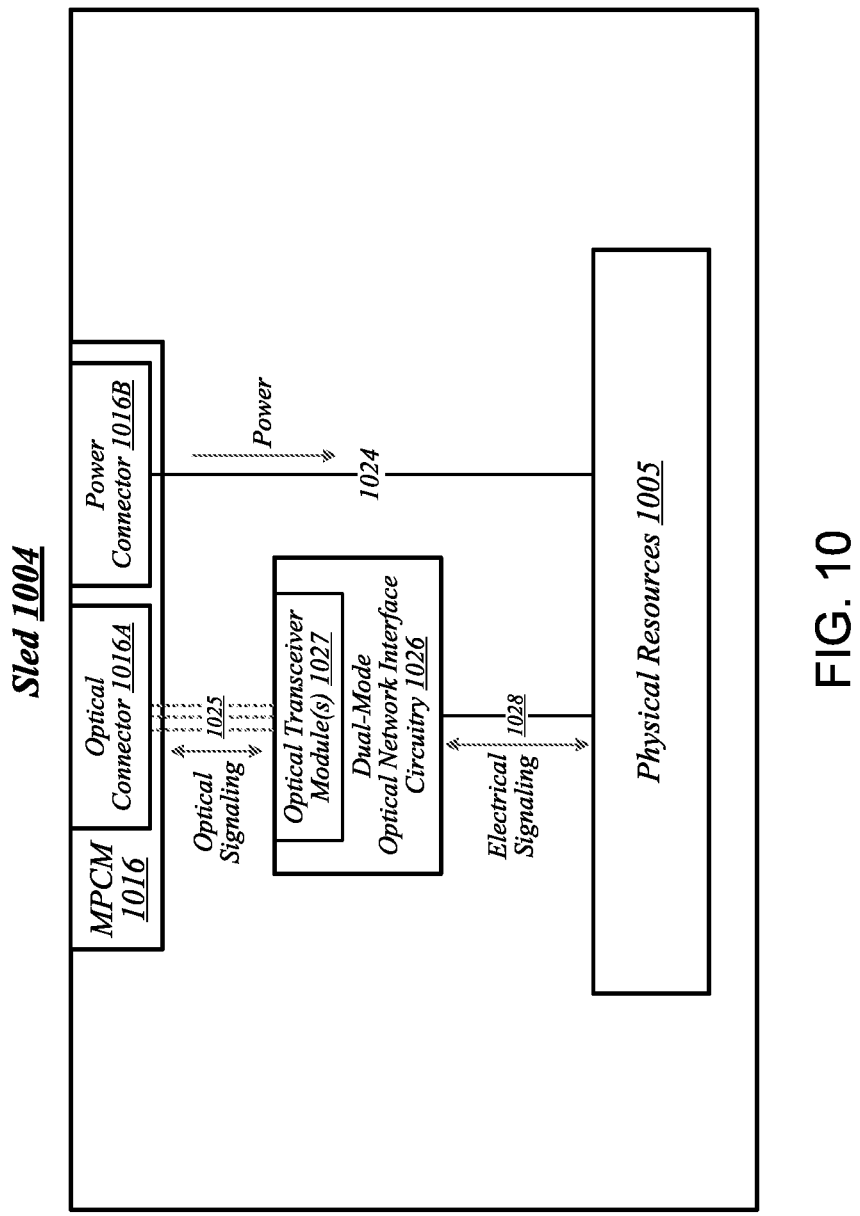
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
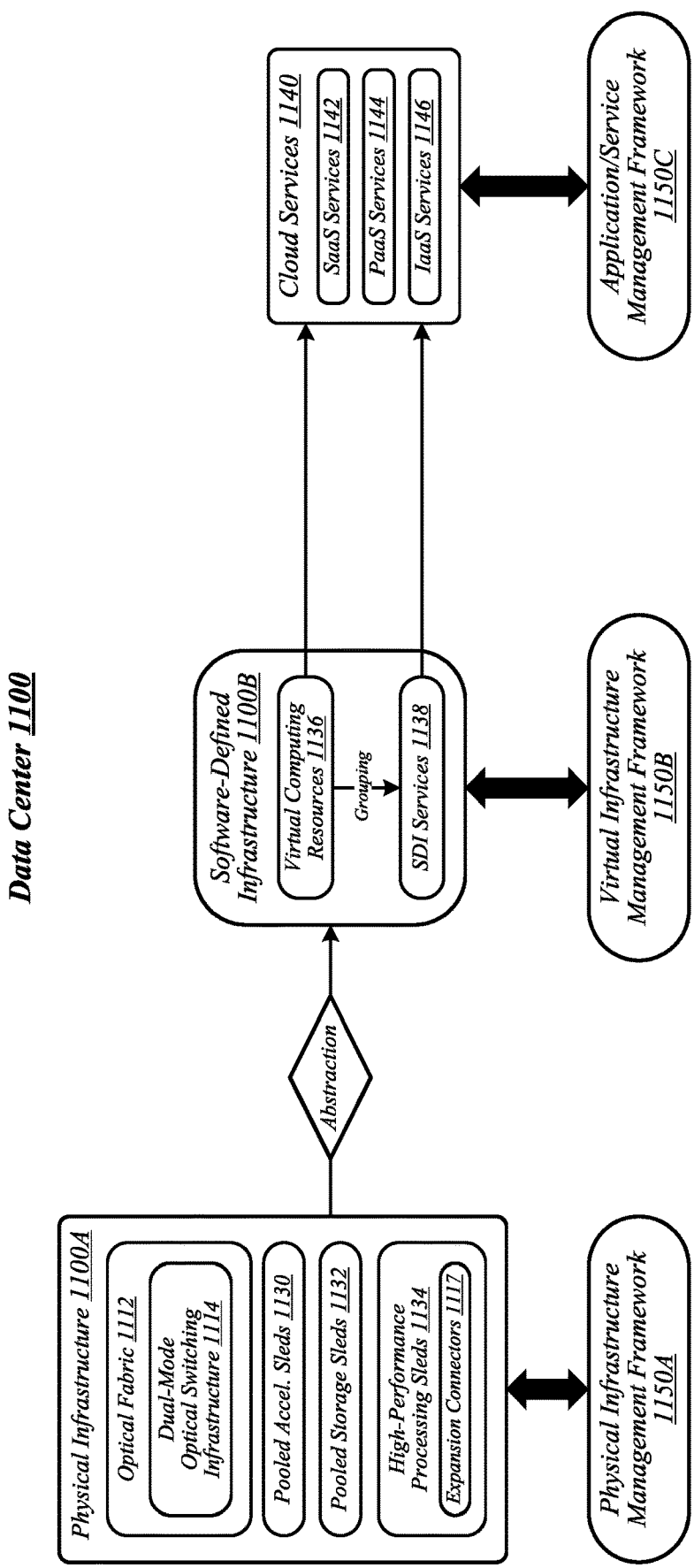
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of software-defined infrastructure (SDI) services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
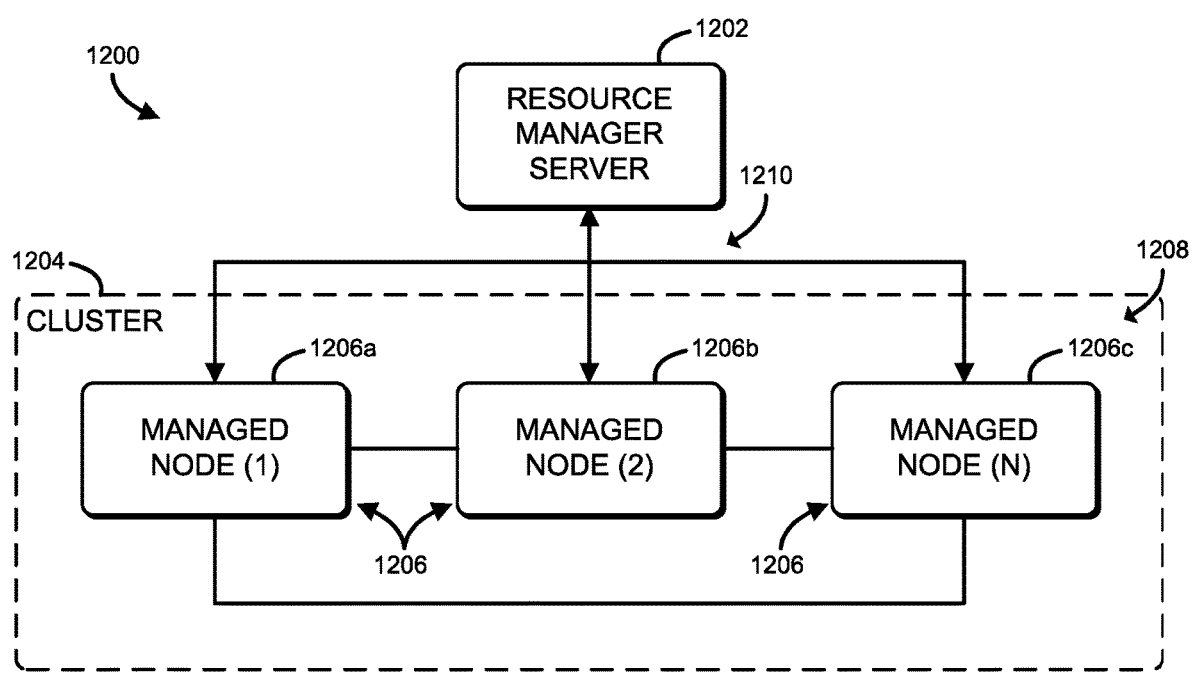
FIG. 12 is a simplified block diagram of at least one embodiment of a system for monitoring node cluster health that includes a resource manager server and a cluster of managed nodes.

Referring now to FIG. 12, a system 1200 for monitoring node cluster health may be implemented in accordance with the data centers 100, 300, 400, 1100 described above with reference to FIGS. 1, 3, 4, and 11. The illustrative system 1200 includes a resource manager server 1202 communicatively coupled to a cluster 1204 (i.e., a node cluster) of composed nodes (e.g., managed nodes 1206) which can include resources from various types sleds. Each of the managed nodes 1206 is communicatively coupled to at least one other managed node 1206 of the cluster 1204 to form a data network 1208 through which the managed nodes 1206 can communicate.

The resource manager server 1202 is configured to receive resource data indicative of utilization levels for allocated resources for each managed node 1206 of the cluster 1204. The resource data may include data indicative of a level of reliability, availability, and resiliency of a resource, for example. In use, the resource manager server 1202 receives health data from each of the managed nodes 1206 of the cluster 1204 and determines whether a failure event has been detected. To do so, as will be described in further detail below, the resource manager server 1202 receives the health data from the managed nodes 1206 via respective communication channels of an out-of-band network (e.g, out-of-band network 1210), which will operate even if one of the managed nodes 1206 fails. Based on the received health data, the resource manager server 1202 can identify whether a managed node 1206, or a service running thereon, has actually failed, as opposed to present techniques in which a false-negative resulting from a network related issue (e.g., network congestion being the root cause of a heartbeat timeout) can be misidentified as a managed node 1206 or service failure. As such, the cluster can react more appropriately and timely.

The managed nodes 1206, as described in further detail below, may be embodied as one or more sleds in a data center (e.g., one of the sleds 204, 404, 504, 1004, 1130, 1132, 1134). In an illustrative example, the managed nodes 1206 may include one or more accelerator sleds (e.g., one or more of the accelerator sleds 1130 of FIG. 11), one or more storage sleds (e.g., one or more of the storage sleds 1132 of FIG. 11), and/or one or more compute sleds (e.g., one or more of the high-performance processing sleds 1134 of FIG. 11). The illustrative managed nodes 1206 include a first managed node, designated as managed node (1) 1206a, a second managed node, designated as managed node (2) 1206b, and a third managed node, designated as managed node (N) 1206*c*, wherein "N" is a positive integer which represents the Nth managed node 1206. As illustratively shown managed node (1) 1206*a* is communicatively coupled to managed node (2) 1206*b* and managed node (N) 1206*c*, while managed node (2) 1206*b* is communicatively coupled to managed node (1) 1206*a* and managed node (N) 1206*c*, and so on such that each managed node 1206 is communicatively coupled to another managed node 1206 in the data network 1208.

Figure 13:
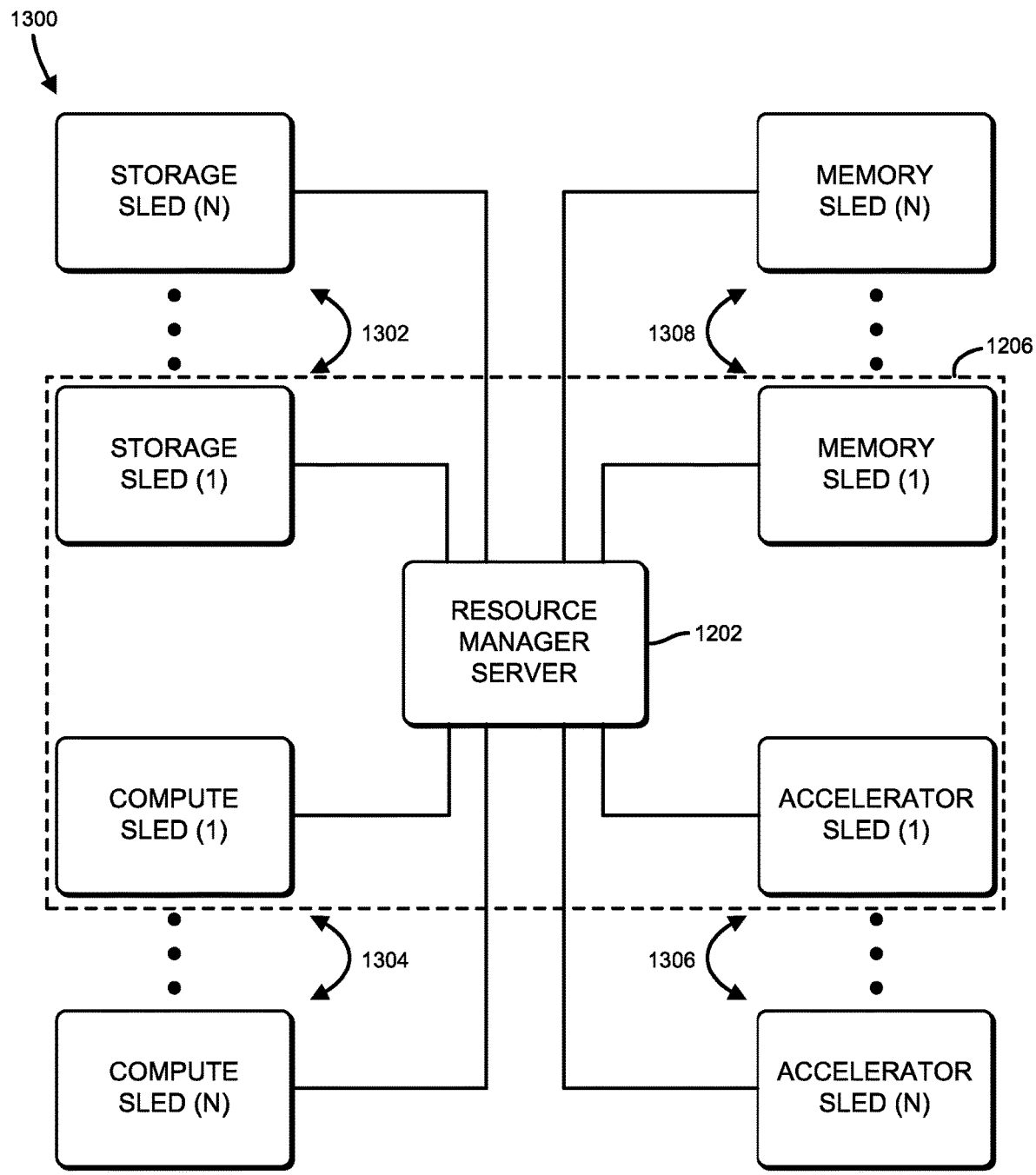
FIG. 13 is a simplified block diagram of at least one embodiment of a managed node.

Referring now to FIG. 13, an illustrative system 1300 may be implemented in accordance with the data centers 100, 300, 400, 1100 described above with reference to FIGS. 1, 3, 4, and 11. In the illustrative embodiment, the system 1300 includes the resource manager server 1202 of FIG. 12 communicatively coupled to multiple sleds including multiple data storage sleds 1302, multiple compute sleds 1304, multiple accelerator sleds 1306, and multiple memory sleds 1308. Each data storage sled 1302 may include the physical storage resources 205-1 of FIG. 2. Each compute sled 1304 may include the physical compute resources 205-4 of FIG. 2 and, in operation, execute an application or workload. Each accelerator sled 1306 may include the physical accelerator resources 205-2 of FIG. 2. Each memory sled 1308 may include the physical memory resources 205-3 of FIG. 2.

One or more of the sleds 1302, 1304, 1306, 1308 may be grouped into a managed node (e.g., the illustrative managed node 1206), such as by the resource manager server 1202 and/or other orchestration management device, to collectively process a workload. In other words, a managed node 1206 may be embodied as an assembly of physical resources 206, including physical compute resources 205-4, physical accelerator resources 205-2, physical storage resources 205-1, physical memory resources 205-3, or other resources, from the same or different sleds (e.g., the sleds 204-1, 204-2, 204-3, 204-4, etc.) or racks (e.g., one or more of racks 302-1 through 302-32).

Further, the managed node 1206 may be established, defined, or "spun up" by the resource manager server 1202 at the time a workload is to be assigned to the managed node or at any other time, and may exist regardless of whether any workloads are presently assigned to the managed node. The system 1300 may be located in a data center and provide storage and compute services (e.g., cloud services) to a client device (not shown) that is in communication with the system 1300 through a network. The resource manager server 1202 may support a cloud operating environment, such as OpenStack, and managed nodes established by the resource manager server 1202 may execute one or more applications or processes (i.e., workloads), such as in virtual machines or containers, on behalf of a user of a client device (not shown).

The resource manager server 1202 may be embodied as any type of computing device capable of monitoring the health and resources of the managed nodes 1206 of the cluster 1204 for a failure (e.g., a hardware failure, a software failure, etc.) and performing the other functions described herein. For example, the resource manager server 1202 may be embodied as a computer, a distributed computing system, one or more sleds (e.g., the sleds 204-1, 204-2, 204-3, 204-4, etc.), a server (e.g., stand-alone, rack-mounted, blade, etc.), a multiprocessor system, a network appliance (e.g., physical or virtual), a desktop computer, a workstation, a laptop computer, a notebook computer, a processor-based system, or a network appliance.

In use, for example, the resource manager server 1202 may receive a managed node composition request from a compute sled 1304 to compose a managed node 1206 to execute a workload. The managed node composition request may include a service level agreement (SLA) (e.g., an agreement between a customer of the data center and the data center operator) that may indicate a target utilization level, throughput, and/or latency (e.g., quality of service (QoS) metrics) for a customer for whom the workload is requested to be executed. To do so, the resource manager server 1202 may collect telemetry data of individual resources on each sled and rack-level aggregated telemetry data of each rack in a data center. For example, the telemetry data of each resource may indicate performance conditions of a corresponding resource (e.g., a present utilization level) on each sled in the data center. Additionally, the aggregated telemetry data of each rack may indicate a performance level of a corresponding rack, such as a power usage of the corresponding rack, error rates for components in the corresponding rack, and an amount of inbound and outbound network communications (e.g., network traffic, network packets, network flows, etc.) to and from the resources of the respective sled 1302, 1304, 1306, 1308 in the corresponding rack.

In response to a receipt of the managed node composition request, the resource manager server 1202 may select a set of resources on one or more sleds 1302, 1304, 1306, 1308 as a function of the individualized telemetry data, as well as the rack-level aggregated telemetry data, to compose a managed node 1206 that satisfies the managed node composition request. Accordingly, the resource manager server 1202 may allocate the physical resources necessary to compose a managed node 1206 that satisfies the target QoS indicated in the managed node request. For example, as shown in FIG. 13, the resource manager server 1202 may allocate one or more compute resources of one of the compute sleds 1304, one or more accelerator resources of one of the accelerator sleds 1306, one or more storage resources of one of the storage sleds 1302, and one or more memory resources of one of the memory sleds 1308 to compose the managed node 1206 in a manner that satisfies the managed node request from the initiating compute sled 1304.

Figure 14:
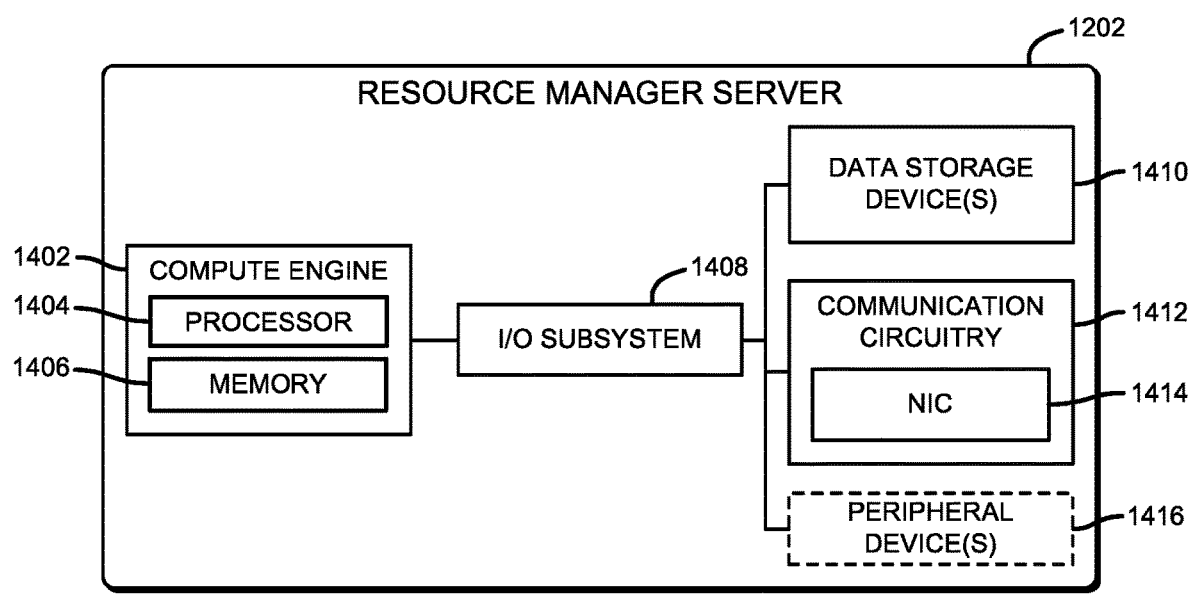
FIG. 14 is a simplified block diagram of at least one embodiment of the resource manager server of the system of FIG. 12.

As shown in FIG. 14, an illustrative resource manager server 1202 includes a processor 1404 and a memory 1406 of a compute engine 1402, an I/O subsystem 1408, one or more data storage devices 1410, communication circuitry 1412 with a NIC 1414, and, in some embodiments, one or more peripheral devices 1416. It should be appreciated that the resource manager server 1202 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The compute engine 1402 may be embodied as any type of device or collection of devices capable of performing the various compute functions as described herein. In some embodiments, the compute engine 1402 may be embodied as a single device such as an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein. Additionally, in some embodiments, the compute engine 1402 may include, or may be embodied as, a processor 1404 (i.e., a central processing unit (CPU)) and memory 1406.

The processor 1404 may be embodied as any type of processor capable of performing the functions described herein. For example, the processor 1404 may be embodied as a single or multi-core processor(s), digital signal processor, microcontroller, or other processor or processing/controlling circuit. In some embodiments, the processor 1404 may be embodied as, include, or otherwise be coupled to a field programmable gate array (FPGA), an application specific integrated circuit (ASIC), reconfigurable hardware or hardware circuitry, or other specialized hardware to facilitate performance of the functions described herein.

The memory 1406 may be embodied as any type of volatile (e.g., dynamic random access memory (DRAM), etc.) or non-volatile memory or data storage capable of performing the functions described herein. It should be appreciated that the memory 1406 may include main memory (i.e., a primary memory) and/or cache memory (i.e., memory that can be accessed more quickly than the main memory). Volatile memory may be a storage medium that requires power to maintain the state of data stored by the medium. Non-limiting examples of volatile memory may include various types of random access memory (RAM), such as dynamic random access memory (DRAM) or static random access memory (SRAM).

One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1406 may be integrated into the processor 1404. In operation, the memory 1406 may store various software and data used during operation such as job request data, kernel map data, telemetry data, applications, programs, libraries, and drivers.

The compute engine 1402 is communicatively coupled to other components of the resource manager server 1202 via the I/O subsystem 1408, which may be embodied as circuitry and/or components to facilitate input/output operations with the processor 1404, the memory 1406, and other components of the resource manager server 1202. For example, the I/O subsystem 1408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1408 may form a portion of a system-on-a-chip (SoC) and be incorporated, along with one or more of the processor 1404, the memory 1406, and other components of the resource manager server 1202, on a single integrated circuit chip.

The one or more data storage devices 1410 may be embodied as any type of storage device(s) configured for short-term or long-term storage of data, such as, for example, memory devices and circuits, memory cards, hard disk drives, solid-state drives, or other data storage devices. Each data storage device 1410 may include a system partition that stores data and firmware code for the data storage device 1410. Each data storage device 1410 may also include an operating system partition that stores data files and executables for an operating system.

The communication circuitry 1412 may be embodied as any communication circuit, device, or collection thereof, capable of enabling communications between the resource manager server 1202 and other compute devices (e.g., the managed nodes 1206) over a network. Accordingly, the communication circuitry 1412 may be configured to use any one or more communication technology (e.g., wired or wireless communications) and associated protocols (e.g., Ethernet, Bluetooth®, Wi-Fi®, WiMAX, etc.) to effect such communication.

The illustrative communication circuitry 1412 includes a network interface controller (NIC) 1414, which may also be referred to as a host fabric interface (HFI). The NIC 1414 may be embodied as one or more add-in-boards, daughtercards, network interface cards, controller chips, chipsets, or other devices that may be used by the resource manager server 1202 to connect with another compute device (e.g., one of the managed nodes 1206). In some embodiments, the NIC 1414 may be embodied as part of a system-on-a-chip (SoC) that includes one or more processors, or included on a multichip package that also contains one or more processors. In some embodiments, the NIC 1414 may include a local processor (not shown) and/or a local memory (not shown) that are both local to the NIC 1414. In such embodiments, the local processor of the NIC 1414 may be capable of performing one or more of the functions of the processor 1404 described herein. Additionally or alternatively, in such embodiments, the local memory of the NIC 1414 may be integrated into one or more components of the resource manager server 1202 at the board level, socket level, chip level, and/or other levels.

The one or more peripheral devices 1416 may include any type of device that is usable to input information into the resource manager server 1202 and/or receive information from the resource manager server 1202. The peripheral devices 1416 may be embodied as any auxiliary device usable to input information into the resource manager server 1202, such as a keyboard, a mouse, a microphone, a barcode reader, an image scanner, etc., or output information from the resource manager server 1202, such as a display, a speaker, graphics circuitry, a printer, a projector, etc. It should be appreciated that, in some embodiments, one or more of the peripheral devices 1416 may function as both an input device and an output device (e.g., a touchscreen display, a digitizer on top of a display screen, etc.). It should be further appreciated that the types of peripheral devices 1416 connected to the resource manager server 1202 may depend on, for example, the type and/or intended use of the resource manager server 1202. Additionally or alternatively, in some embodiments, the peripheral devices 1416 may include one or more ports, such as a USB port, for example, for connecting external peripheral devices to the resource manager server 1202.

Figure 15:
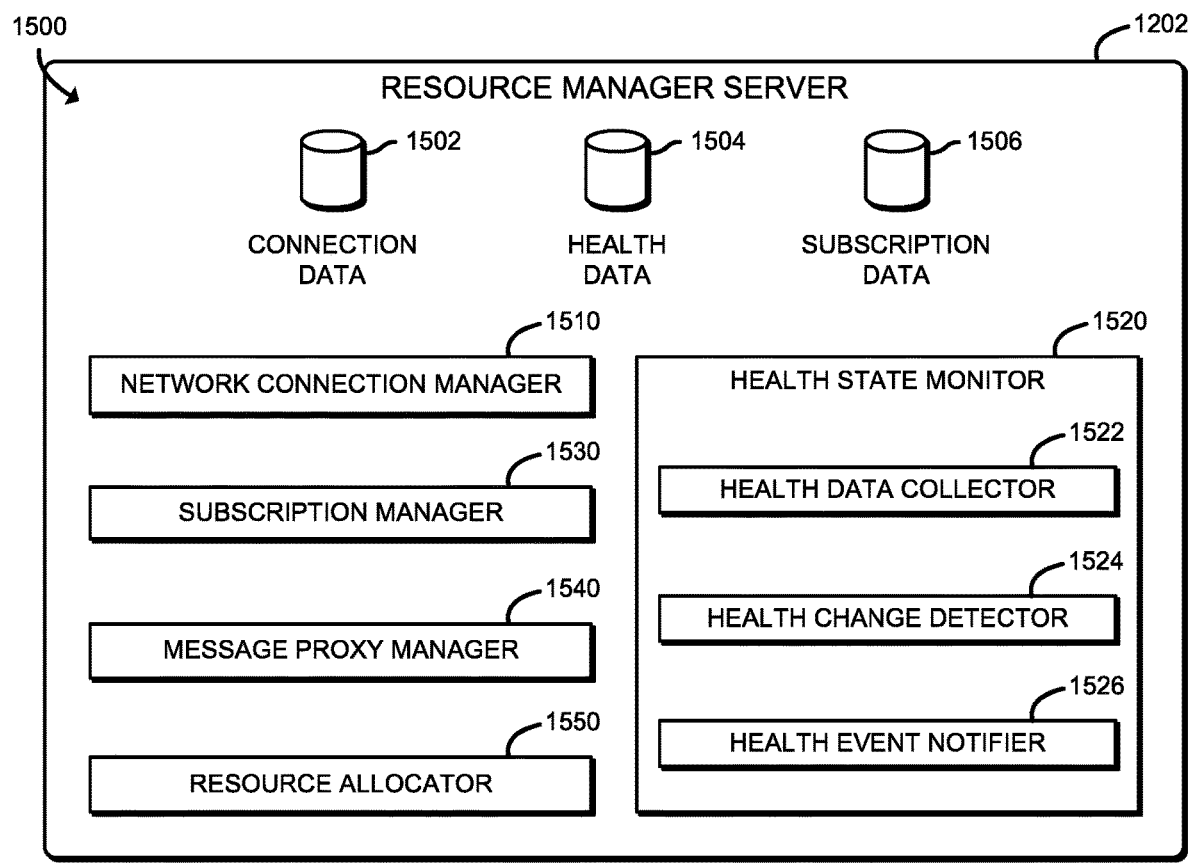
FIG. 15 is a simplified block diagram of at least one embodiment of an environment that may be established by the resource manager server of FIGS. 12 and 13.

Referring now to FIG. 15, the resource manager server 1202 may establish an environment 1500 during operation. The illustrative environment 1500 includes a network connection manager 1510, a health sate monitor 1520, a subscription manager 1530, a message proxy manager 1540, and a resource allocator 1550. Each of the components of the environment 1500 may be embodied as hardware, firmware, software, or a combination thereof. As such, in some embodiments, one or more of the components of the environment 1500 may be embodied as circuitry or a collection of electrical devices (e.g., network connection management circuitry 1510, health sate monitoring circuitry 1520, subscription management circuitry 1530, message proxy management circuitry 1540, resource allocation circuitry 1550, etc.). It should be appreciated that, in such embodiments, one or more of the network connection management circuitry 1510, the health sate monitoring circuitry 1520, the subscription management circuitry 1530, the message proxy management circuitry 1540, and the resource allocation circuitry 1550 may form a portion of one or more of the compute engine 1402, the one or more data storage devices 1410, the communication circuitry 1412, and/or any other components of the resource manager server 1202.

In the illustrative embodiment, the environment 1500 additionally includes connection data 1502, health data 1504, and subscription data 1506, each of which may be embodied as any data established by the resource manager server 1202. The connection data 1502 may include any data usable to establish and/or identify a network connection between the resource manager server 1202 and another computing device (e.g., the managed nodes 1206 of the cluster 1204), including out-of-band connections. The health data 1504 may include any data usable to identify a health status of one or more managed nodes (e.g., the managed nodes 1206 of the cluster 1204). The subscription data 1506 may include a list of which managed nodes 1206 have subscribed to which events.

The network connection manager 1510, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the resource manager server 1202, respectively. To do so, the network connection manager 1510 is configured to receive and process data packets from one system or computing device (e.g., one of the managed nodes 1206) and to prepare and send data packets to another computing device or system (e.g., one of the managed nodes 1206). Accordingly, in some embodiments, at least a portion of the functionality of the network connection manager 1510 may be performed by the communication circuitry 1412, or more particularly by the NIC 1414.

The network connection manager 1510 is additionally configured to establish out-of-band connections (e.g., of the out-of-band network 1210) between the network connection manager 1510 and each of the managed nodes 1206. Further, the network connection manager 1510 is configured to facilitate the transmission of commands/requests via the out-of-band connections, as well as the receipt of health data from the managed nodes 1206 via the out-of-band connections of the out-of-band network 1210. The network connection manager 1510 may be configured to store the in-band and out-of-band connection information in the connection data 1502, in some embodiments.

The health state monitor 1520, which may be embodied as hardware, firmware, software, virtualized hardware, emulated architecture, and/or a combination thereof, is configured to monitor the health data received from the managed nodes 1206, or more particularly each sled of the managed nodes 1206 in such embodiments in which the managed nodes 1206 more than one sled e.g., multiple of the sleds 1302, 1304, 1306, 1308 of FIG. 13). To do so, the illustrative health state monitor includes a health data collector 1522, a health change detector 1524, and a health event notifier 1526. The health data collector 1522 is configured to collect health data from the managed nodes 1206 (i.e., received via the out-of-band connections of the out-of-band network 1210). As described previously, the health data may include any data usable to identify a health status of the managed nodes 1206. In some embodiments, the health data collector 1522 may be configured to store the collected health data in the health data 1504.

The health change detector 1524 is configured to analyze the collected health data (e.g., illustratively collected by the health data collector 1522) to determine whether a health change event has been detected, such as a hardware failure, a software failure, or a runtime failure, and, unlike present techniques, classify the failure as being one of a soft failure (i.e., the detected failure is anticipated to be temporary, such as due to a reboot, maintenance, or network congestion) or a hard failure (i.e., the managed node has powered down completely and is not anticipated to recover). Hardware failures may result from the failure of one or more of a component of the managed node 1206, a network cable connected to the managed node 1206, a switch coupled to the managed node 1206, a switch port of the switch having failed, a power delivery failure, overheating, etc. Software failures may result from basic input/output system (BIOS) or firmware bugs or instability, kernel or driver failures causing the operating system to crash, user mode software service instability, sporadic failures to local storage, and/or the like. Runtime failures may result from a security compromise (e.g., a noisy neighbor, a denial of service (DoS) attack, etc.), a processing/message backlog, data network congestion, I/O congestion (e.g., competing for data network bandwidth), etc.

The health event notifier 1526 is configured to transmit a health event notification which includes the detected health change classification (e.g., soft failure or hard failure) to those managed nodes 1206 which have subscribed to the health state change event. To do so, the health event notifier 1526 is configured to receive an indication of the failure type (e.g., from the health change detector 1524), identify the managed nodes 1206 which have subscribed to the health state change event (e.g., via the subscription data 1506), generate the notification to include the detected health change classification, and transmit the generated notifications to those managed nodes 1206 identified to have subscribed to the health state change event.

In an illustrative example, the health change detector 1524 may determine that a failure has been detected at managed node (1) 1206a as a result of network timeouts due to congestion on the data network (e.g., the data network 1208). In furtherance of the illustrative example, the health change detector 1524 is configured to determine whether, despite the messages having failed, the affected managed node 1206 is otherwise healthy (i.e., whether the detected failure is a soft or hard failure). Accordingly, if the health event detector 1524 determines the health change event is a soft failure, the health event notifier 1526 is configured to provide a notification indicating as such to the other managed nodes 1206 (e.g., managed nodes 1206b and 1206c) of the cluster 1204. Accordingly, the receiving managed nodes 1206b and 1206c can respond accordingly, such as by rerouting messages for the affected managed node 1206 via the resource manager server 1202 upon receiving a soft failure indication. If the health event detector 1524 determines the health change event is a hard failure, the health event notifier 1526 is configured to provide a notification indicating as such. Accordingly, upon receiving a hard failure indication, the managed nodes 1206b and 1206c can reconcile the cluster state (e.g., through the voting process, agreeing on a consistent state, etc.).

It should be appreciated that, in some embodiments, one or more functions of the health state monitor 1520 may be performed by a service (e.g., a cluster service) being executed remote of the resource manager server. For example, in such an embodiment, the resource manager server 1202 may be configured to collect the health data and transfer the collected health data to the cluster service to identify a type of failure (e.g., hardware or software) and act accordingly.

The subscription manager 1530, which may be embodied as hardware, firmware, software, virtualized hardware, emulated architecture, and/or a combination thereof, is configured to receive subscription requests from the managed nodes 1206 (e.g., via the out-of-band network 1210) and manage the subscribed managed nodes 1206 for the appropriate events. For example, the subscription manager 1530 is configured to receive a request from one of the managed nodes 1206 which indicates that managed node 1206 would like to subscribe to a health state change event, which has been described previously. In some embodiments, records identifying which managed nodes 1206 are subscribed to which events may be stored by the subscription manager 1530 in the subscription data 1506.

The message proxy manager 1540, which may be embodied as hardware, firmware, software, virtualized hardware, emulated architecture, and/or a combination thereof, is configured to reroute messages intended for a managed node 1206 which has been identified as being subject to a soft failure. To do so, the message proxy manager 1540 is configured to receive the messages from the other managed nodes 1206 of the cluster 1204 via the out-of-band network 1210 and transmit the received messages to the affected managed node 1206 via the out-of-band network 1210.

The resource allocator 1550, which may be embodied as hardware, firmware, software, virtualized hardware, emulated architecture, and/or a combination thereof, is configured to manage the available and allocated of the managed nodes 1206 of the cluster 1204. To do so, the resource allocator 1550 is configured to identify which resources to allocate for a particular purpose. Such resources may be allocated by type, amount, performance, intended use, etc., and may include network communication resources, storage resources, compute resources, etc.

Figure 16:
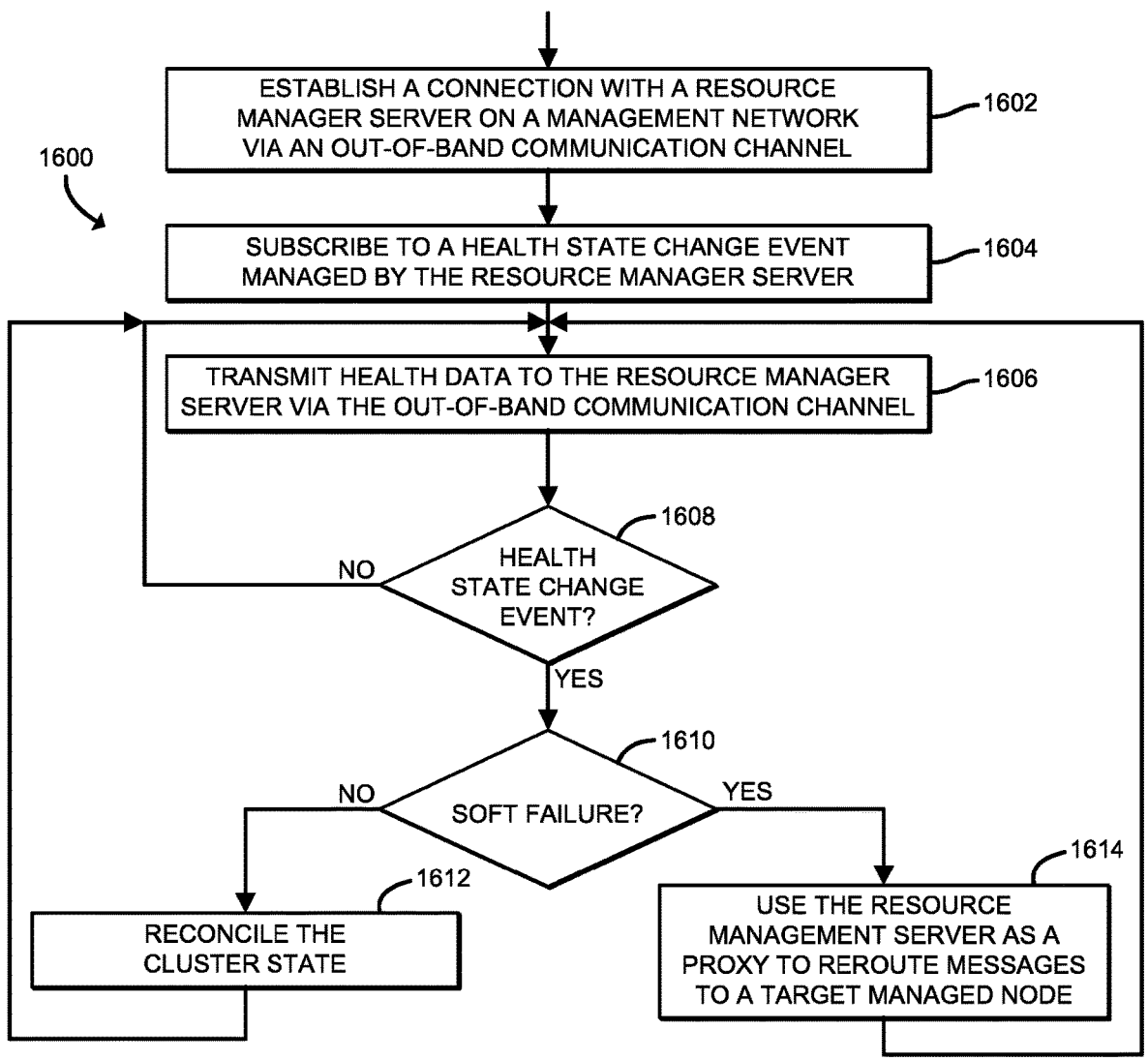
FIG. 16 is a simplified flow diagram of at least one embodiment of a method for establishing a connection with the resource manager server of FIGS. 12 and 13 that may be performed by one or more of the managed nodes of FIGS. 12 and 14.

Referring now to FIG. 16, in use, a managed node of a cluster of nodes (e.g., one of the managed nodes 1206 of the illustrative cluster 1204 of FIG. 12) may execute a method 1600 for establishing a connection with an associated resource manager server (e.g., the resource manager server 1202 of FIG. 12). The method 1600 begins in block 1602, in which the managed node 1206 establishes a connection with the resource manager server 1202 via an out-of-band communication channel (e.g., of the out-of-band network 1210 of FIG. 12). It should be appreciated that, as described previously, the managed node 1206 includes one or more different sleds (e.g., one or more of the sleds 1302, 1304, 1306, 1308 of FIG. 13). As such, while the method 1600 is described as being performed by the managed node 1206, it should be further appreciated that the method 1600 may be performed, more particularly, by each sled of the managed node 1206, if applicable. In block 1604, the managed node 1206 subscribes to a health state change event managed by the resource manager server 1202. In block 1606, the managed node 1206 transmits health data of the managed node 1206 to the resource manager server 1202 via the out-of-band communication channel.

In block 1608, the managed node 1206 determines whether a health state change event has been received. If not, the method 1600 returns to block 1606 to transmit additional health data to the resource manager server 1202. Otherwise, if the managed node 1206 determines that a health state change event has been received, the method 1600 advances to block 1610. In block 1610, the managed node 1206 determines whether the received health state change event corresponds to a soft failure (i.e., as opposed to a hard failure). If the managed node 1206 determines the received health state change event does not correspond to a soft failure (i.e., the event corresponds to a hard failure), the method 1600 advances to block 1612, in which the managed node 1206 reconciles the cluster state by following the standard exception handling protocols (e.g., goes through the voting process, agrees on a consistent state, etc.).

If the managed node 1206 determines the received health state change event corresponds to a soft failure (i.e., the affected managed node is healthy or otherwise expected to come back online), the method branches to block 1614. In block 1614, the managed node 1206 uses the resource manager server 1202 to reroute messages to a target managed node via the out-of-band communication channel. In other words, the managed node 1206 can bypass the affected node (i.e., the data network 1208 communication channels connecting the affected managed node to node cluster which are otherwise used as a transmission path across the data network 1208 to the target managed node) by using the resource manager server 1202 as a proxy to reroute the messages.

Figure 17:
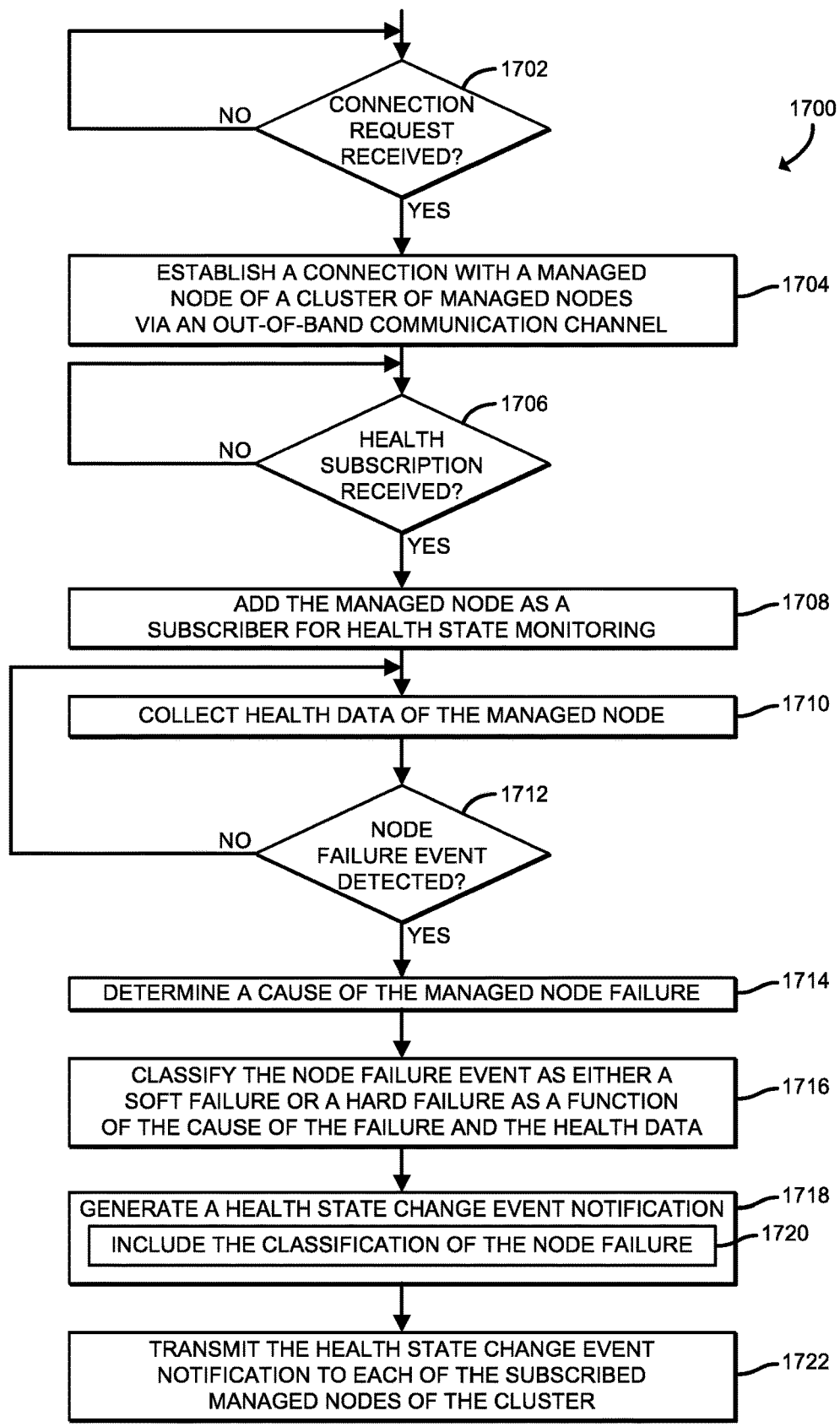
FIG. 17 is a simplified flow diagram of at least one embodiment of a method for detecting a health state change event at one of the managed nodes of FIGS. 12 and 14 that may be performed by the resource manager server of FIGS. 12 and 13.

Referring now to FIG. 17, in use, a resource manager server (e.g., the resource manager server 1202 of FIG. 12) may execute a method 1700 for detecting a health state change event of a managed node of a cluster of managed nodes (e.g., one of the managed nodes 1206 of the illustrative cluster 1204 of FIG. 12). In block 1702, determines whether a connection request has been received from the managed node 1206. If so, the method 1700 advances to block 1704, in which the resource manager server 1202 establishes a connection with the managed node 1206 from which the connection request was received in block 1702 via an out-of-band communication channel (e.g., of the out-of-band network 1210 of FIG. 12).

In block 1706, the resource manager server 1202 determines whether a health subscription request has been received from the managed node 1206. If so, the method 1700 advances to block 1708, in which the resource manager server 1202 adds the managed node 1206 as a subscriber for health state monitoring. In other words, the resource manager server 1202 adds the managed node 1206 as a subscriber to receive an indication of a health state change. In block 1710, the resource manager server 1202 collects health data of the managed node 1206. In block 1712, the resource manager server 1202 determines whether a failure event has been detected. As described previously, a failure event may be detected as a result of the network timeout, which may be attributable to network congestion that might trigger a node cluster state reconciliation for an otherwise healthy managed node (i.e., a false negative).

If the resource manager server 1202 has not detected a failure event, the method 1700 returns to block 1710 to continue collecting health data of the managed node 1206; otherwise, the method 1700 advances to block 1714. In block 1714, the resource manager server 1202 determines a cause of the managed node 1206 failure. As described previously, the managed failure may be caused by a hardware failure, a software failure, a runtime failure, etc. In block 1716, the resource manager server 1202 classifies the failure as either a soft failure or a hard failure as a function of the cause of the failure and the collected health data of the affected managed node 1206. As also described previously, a soft failure may be attributable to the detected failure of the affected managed node 1206 having been anticipated as being temporary (e.g., due to a reboot, maintenance, network congestion, etc.); whereas a hard failure may be attributable to the affected managed node 1206 having powered down completely and is not anticipated to recover.

In block 1718, the resource manager server 1202 generates a health state change event notification. In block 1720, the resource manager server 1202 includes the classification of the failure in the health state change event notification generated in block 1718. In block 1722, the resource manager server 1202 transmits the generated health state change event notification to each of the subscribed managed nodes 1206 of the cluster 1204. While the embodiments illustratively described here are usable to identify whether a managed node 1206 has suffered a failure event, it should be appreciated that the method 1700 described herein may be usable to identify failure of a service, in other embodiments.

EXAMPLES

Illustrative examples of the technologies disclosed herein are provided below. An embodiment of the technologies may include any one or more, and any combination of, the examples described below.

Example 1 includes a resource manager server for monitoring node cluster health, the resource manager server comprising a compute engine to receive, via an out-of-band network, health data from each of a plurality of sleds of a managed node of a node cluster that includes a plurality of managed nodes, wherein each of the plurality of managed nodes are communicatively coupled across a data network; identify whether a sled of the managed node has indicated a failure; determine a cause of the failure; classify the failure as being one of a soft failure or a hard failure as a function of the received health data and the cause of the failure; and transmit a health state change event to each of the other managed nodes of the plurality of managed nodes of the node cluster.

Example 2 includes the subject matter of Example 1, and wherein to receive the health data comprises to receive data usable to identify a health status of each of the sleds.

Example 3 includes the subject matter of any of Examples 1 and 2, and wherein to identify whether the sled has indicated the failure comprises to determine whether the sled has indicated one of a hardware failure, a software failure, or a runtime failure.

Examples 4 includes the subject matter of any of Examples 1-3, and wherein to classify the failure as being the soft failure comprises to determine the cause of the failure as being temporary as a function of the received health data and the cause of the failure.

Examples 5 includes the subject matter of any of Examples 1-4, and wherein to determine the cause of the failure as being temporary comprises to determine whether the failure event is a result of congestion across the data network.

Examples 6 includes the subject matter of any of Examples 1-5, and wherein to determine the cause of the failure as being temporary comprises to determine whether the failure event is a result of scheduled maintenance being performed on the sled.

Examples 7 includes the subject matter of any of Examples 1-6, and wherein to determine the cause of the failure as being temporary comprises to determine whether the failure event is a result of the sled being rebooted.

Examples 8 includes the subject matter of any of Examples 1-7, and wherein to classify the failure as being the hard failure comprises to determine the cause of the failure as being permanent as a function of the received health data and the cause of the failure.

Examples 9 includes the subject matter of any of Examples 1-8, and wherein to determine the cause of the failure as being permanent comprises to determine whether the failure event is a result of the sled being powered down.

Examples 10 includes the subject matter of any of Examples 1-9, and wherein to transmit the health state change event comprises to transmit an indication of the failure as being one of the soft failure or the hard failure.

Examples 11 includes the subject matter of any of Examples 1-10, and wherein the compute engine is further to receive, via the out-of-band network, a subscription request from another managed node of the plurality of managed nodes; and add, in response to having received the subscription request, the other managed node as a subscriber, wherein to transmit the health state change event to each of the other managed nodes of the plurality of managed nodes of the node cluster comprises to transmit the health state change event to the other managed node subsequent to having subscribed the other managed node as a subscriber to receive the indication of the health state change.

Examples 12 includes a method for monitoring node cluster health, the method comprising receiving, by a resource manager server via an out-of-band network, health data from each of a plurality of sleds of a managed node of a node cluster that includes a plurality of managed nodes, wherein each of the plurality of managed nodes are communicatively coupled across a data network; identifying, by the resource manager server, whether a sled of the managed node has indicated a failure; determining, by the resource manager server, a cause of the failure; classifying, by the resource manager server, the failure as being one of a soft failure or a hard failure as a function of the received health data and the cause of the failure; and transmitting, by the resource manager server, a health state change event to each of the other managed nodes of the plurality of managed nodes of the node cluster.

Examples 13 includes the subject matter of Examples 12, and wherein receiving the health data comprises receiving data usable to identify a health status of each of the sleds.

Examples 14 includes the subject matter of any of Examples 12 and 13, and wherein identifying whether the sled has indicated the failure comprises determining whether the sled has indicated one of a hardware failure, a software failure, or a runtime failure.

Examples 15 includes the subject matter of any of Examples 12-14, and wherein classifying the failure as being the soft failure comprises determining the cause of the failure as being temporary as a function of the received health data and the cause of the failure.

Examples 16 includes the subject matter of any of Examples 12-15, and wherein determining the cause of the failure as being temporary comprises determining whether the failure event is a result of congestion across the data network.

Examples 17 includes the subject matter of any of Examples 12-16, and wherein determining the cause of the failure as being temporary comprises determining whether the failure event is a result of scheduled maintenance being performed on the sled.

Examples 18 includes the subject matter of any of Examples 12-17, and wherein determining the cause of the failure as being temporary comprises determining whether the failure event is a result of the sled being rebooted.

Examples 19 includes the subject matter of any of Examples 12-18, and wherein classifying the failure as being the hard failure comprises determining the cause of the failure as being permanent as a function of the received health data and the cause of the failure.

Examples 20 includes the subject matter of any of Examples 12-19, and wherein determining the cause of the failure as being permanent comprises determining whether the failure event is a result of the sled being powered down.

Examples 21 includes the subject matter of any of Examples 12-20, and wherein transmitting the health state change event comprises transmitting an indication of the failure as being one of the soft failure or the hard failure.

Examples 22 includes the subject matter of any of Examples 12-21, and further including receiving, by the resource manager server via the out-of-band network, a subscription request from another managed node of the plurality of managed nodes; and adding, by the resource manager server and in response to having received the subscription request, the other managed node as a subscriber, wherein transmitting the health state change event to each of the other managed nodes of the plurality of managed nodes of the node cluster comprises transmitting the health state change event to the other managed node subsequent to having subscribed the other managed node as a subscriber to receive the indication of the health state change.

Examples 23 includes one or more machine-readable storage media comprising a plurality of instructions stored thereon that, in response to being executed, cause a resource manager server to perform the method of any of Examples 12-22.

Examples 24 includes a resource manager server comprising one or more processors; one or more memory devices having stored therein a plurality of instructions that, when executed by the one or more processors, cause the compute device to perform the method of any of Examples 12-22.

Examples 25 includes a resource manager server comprising health state monitoring circuitry to receive, via an out-of-band network, health data from each of a plurality of sleds of a managed node of a node cluster that includes a plurality of managed nodes, wherein each of the plurality of managed nodes are communicatively coupled across a data network; identify whether a sled of the managed node has indicated a failure; determine a cause of the failure; classify the failure as being one of a soft failure or a hard failure as a function of the received health data and the cause of the failure; and transmit a health state change event to each of the other managed nodes of the plurality of managed nodes of the node cluster.

Examples 26 includes the subject matter of Examples 25, and wherein to receive the health data comprises to receive data usable to identify a health status of each of the sleds.

Examples 27 includes the subject matter of any of Examples 25 and 26, and wherein to identify whether the sled has indicated the failure comprises to determine whether the sled has indicated one of a hardware failure, a software failure, or a runtime failure.

Examples 28 includes the subject matter of any of Examples 25-27, and wherein to classify the failure as being the soft failure comprises to determine the cause of the failure as being temporary as a function of the received health data and the cause of the failure.

Examples 29 includes the subject matter of any of Examples 25-28, and wherein to determine the cause of the failure as being temporary comprises to determine whether the failure event is a result of congestion across the data network.

Examples 30 includes the subject matter of any of Examples 25-29, and wherein to determine the cause of the failure as being temporary comprises to determine whether the failure event is a result of scheduled maintenance being performed on the sled.

Examples 31 includes the subject matter of any of Examples 25-30, and wherein to determine the cause of the failure as being temporary comprises to determine whether the failure event is a result of the sled being rebooted.

Examples 32 includes the subject matter of any of Examples 25-31, and wherein to classify the failure as being the hard failure comprises to determine the cause of the failure as being permanent as a function of the received health data and the cause of the failure.

Examples 33 includes the subject matter of any of Examples 25-32, and wherein to determine the cause of the failure as being permanent comprises to determine whether the failure event is a result of the sled being powered down.

Examples 34 includes the subject matter of any of Examples 25-33, and wherein to transmit the health state change event comprises to transmit an indication of the failure as being one of the soft failure or the hard failure.

Examples 35 includes the subject matter of any of Examples 25-34, and wherein the health state monitoring circuitry is further to receive, via the out-of-band network, a subscription request from another managed node of the plurality of managed nodes; and add, in response to having received the subscription request, the other managed node as a subscriber, wherein to transmit the health state change event to each of the other managed nodes of the plurality of managed nodes of the node cluster comprises to transmit the health state change event to the other managed node subsequent to having subscribed the other managed node as a subscriber to receive the indication of the health state change.

Examples 36 includes a resource manager server comprising circuitry for receiving, by a resource manager server via an out-of-band network, health data from each of a plurality of sleds of a managed node of a node cluster that includes a plurality of managed nodes, wherein each of the plurality of managed nodes are communicatively coupled across a data network; means for identifying, by the resource manager server, whether a sled of the managed node has indicated a failure; means for determining, by the resource manager server, a cause of the failure; means for classifying, by the resource manager server, the failure as being one of a soft failure or a hard failure as a function of the received health data and the cause of the failure; and circuitry for transmitting, by the resource manager server, a health state change event to each of the other managed nodes of the plurality of managed nodes of the node cluster.

Examples 37 includes the subject matter of Examples 36, and wherein the circuitry for receiving the health data comprises circuitry for receiving data usable to identify a health status of each of the sleds.

Examples 38 includes the subject matter of any of Examples 36 and 37, and wherein the means for identifying whether the sled has indicated the failure comprises means for determining whether the sled has indicated one of a hardware failure, a software failure, or a runtime failure.

Examples 39 includes the subject matter of any of Examples 36-38, and wherein the means for classifying the failure as being the soft failure comprises means for determining the cause of the failure as being temporary as a function of the received health data and the cause of the failure.

Examples 40 includes the subject matter of any of Examples 36-39, and wherein the means for determining the cause of the failure as being temporary comprises means for determining whether the failure event is a result of congestion across the data network.

Examples 41 includes the subject matter of any of Examples 36-40, and wherein the means for determining the cause of the failure as being temporary comprises means for determining whether the failure event is a result of scheduled maintenance being performed on the sled.

Examples 42 includes the subject matter of any of Examples 36-41, and wherein the means for determining the cause of the failure as being temporary comprises means for determining whether the failure event is a result of the sled being rebooted.

Examples 43 includes the subject matter of any of Examples 36-42, and wherein the means for classifying the failure as being the hard failure comprises means for determining the cause of the failure as being permanent as a function of the received health data and the cause of the failure.

Examples 44 includes the subject matter of any of Examples 36-43, and wherein the means for determining the cause of the failure as being permanent comprises means for determining whether the failure event is a result of the sled being powered off completely.

Examples 45 includes the subject matter of any of Examples 36-44, and wherein the circuitry for transmitting the health state change event comprises circuitry for transmitting an indication of the failure as being one of the soft failure or the hard failure.

Examples 46 includes the subject matter of any of Examples 36-45, and further including circuitry for receiving, by the resource manager server via the out-of-band network, a subscription request from another managed node of the plurality of managed nodes, wherein the subscription request includes information usable to identify one or more sleds of the other managed node; and means for adding, by the resource manager server and in response to having received the subscription request, the other managed node as a subscriber, wherein the circuitry for transmitting the health state change event to each of the other managed nodes of the plurality of managed nodes of the node cluster comprises circuitry for transmitting the health state change event to the other managed node subsequent to having subscribed the other managed node as a subscriber to receive the indication of the health state change.

Examples 47 includes a sled of a managed node of a node cluster for monitoring node cluster health, the sled comprising compute circuitry to establish a first connection in a data network with one or more other sleds of another managed node of the node cluster; establish a second connection in an out-of-band network with a resource manager server; transmit a subscription request to the resource manager server, wherein the subscription request is usable to indicate the sled is to receive health state change event indications; receive an indication that a health state change event has been detected by the resource manager, wherein the indication includes a classification of a failure associated with the other managed node of the node cluster; and perform an action as a function of the classification of the failure.

Examples 48 includes the subject matter of Examples 47, and wherein the classification of the failure comprises one of a hard failure and a soft failure.

Examples 49 includes the subject matter of any of Examples 47 and 48, and wherein to perform the action as a function of the classification of the failure comprises to reconcile a state of the node cluster in response to the classification indicating the failure associated with the other managed node is permanent.

Examples 50 includes the subject matter of any of Examples 47-49, and wherein to reconcile the state of the node cluster comprises to conduct a quorum voting process among the managed node and the other managed nodes to agree on a consistent state of the node cluster without the other managed node.

Examples 51 includes the subject matter of any of Examples 47-50, and wherein to perform the action as a function of the classification of the failure comprises to use the out-of-band network to transmit messages to a target managed node via the resource manager server to bypass the other managed node.

Examples 52 includes a method for monitoring node cluster health, the method comprising establishing, by a sled of a managed node of a node cluster, a first connection in a data network with one or more other sleds of another managed node of the node cluster; establishing, by the sled, a second connection in an out-of-band network with a resource manager server; transmitting, by the sled, a subscription request to the resource manager server, wherein the subscription request is usable to indicate the sled is to receive health state change event indications; receiving, by the sled, an indication that a health state change event has been detected by the resource manager, wherein the indication includes a classification of a failure associated with the other managed node of the node cluster; and performing, by the sled, an action as a function of the classification of the failure.

Examples 53 includes the subject matter of Examples 52, and wherein receiving the classification of the failure comprises receiving an indication of the failure being one of a hard failure or a soft failure.

Examples 54 includes the subject matter of any of Examples 52 and 53, and wherein performing the action as a function of the classification of the failure comprises reconciling a state of the node cluster in response to the classification indicating the failure associated with the other managed node is permanent.

Examples 55 includes the subject matter of any of Examples 52-54, and wherein reconciling the state of the node cluster comprises conducting a quorum voting process among the managed node and the other managed nodes to agree on a consistent state of the node cluster without the other managed node.

Examples 56 includes the subject matter of any of Examples 52-55, and wherein performing the action as a function of the classification of the failure comprises using the out-of-band network to transmitting messages to a target managed node via the resource manager server to bypass the other managed node.

Examples 57 includes one or more machine-readable storage media comprising a plurality of instructions stored thereon that, in response to being executed, cause a sled of a managed node of a node cluster to perform the method of any of Examples 52-56.

Examples 58 includes a sled of a managed node of a node cluster comprising one or more processors; one or more memory devices having stored therein a plurality of instructions that, when executed by the one or more processors, cause the sled to perform the method of any of Examples 52-56.

Examples 59 includes a sled comprising communication circuitry to establish a first connection in a data network with one or more other sleds of another managed node of a node cluster; establish a second connection in an out-of-band network with a resource manager server; transmit a subscription request to the resource manager server, wherein the subscription request is usable to indicate the sled is to receive health state change event indications; receive an indication that a health state change event has been detected by the resource manager, wherein the indication includes a classification of a failure associated with the other managed node of the node cluster; and perform an action as a function of the classification of the failure.

Examples 60 includes the subject matter of Examples 59, and wherein the classification of the failure comprises one of a hard failure and a soft failure.

Examples 61 includes the subject matter of any of Examples 59 and 60, and wherein to perform the action as a function of the classification of the failure comprises to reconcile a state of the node cluster in response to the classification indicating the failure associated with the other managed node is permanent.

Examples 62 includes the subject matter of any of Examples 59-61, and wherein to reconcile the state of the node cluster comprises to conduct a quorum voting process among the managed node and the other managed nodes to agree on a consistent state of the node cluster without the other managed node.

Examples 63 includes the subject matter of any of Examples 59-62, and wherein to perform the action as a function of the classification of the failure comprises to use the out-of-band network to transmit messages to a target managed node via the resource manager server to bypass the other managed node.

Examples 64 includes a sled of a node cluster comprising circuitry for establishing a first connection in a data network with one or more other managed nodes of the node cluster; circuitry for establishing a second connection in an out-of-band network with a resource manager server; circuitry for transmitting a subscription request to the resource manager server, wherein the subscription request is usable to indicate the sled is to receive health state change event indications; circuitry for receiving an indication that a health state change event has been detected by the resource manager, wherein the indication includes a classification of a failure associated with the other managed node of the node cluster; and means for performing an action as a function of the classification of the failure.

Examples 65 includes the subject matter of Examples 64, and wherein the circuitry for receiving the classification of the failure comprises circuitry for receiving an indication of the failure being one of a hard failure or a soft failure.

Examples 66 includes the subject matter of any of Examples 64 and 65, and wherein the means for performing the action as a function of the classification of the failure comprises means for reconciling a state of the node cluster in response to the classification indicating the failure associated with the other managed node is permanent.

Examples 67 includes the subject matter of any of Examples 64-66, and wherein the means for reconciling the state of the node cluster comprises means for conducting a quorum voting process among the managed node and the other managed nodes to agree on a consistent state of the node cluster without the other managed node.

Examples 68 includes the subject matter of any of Examples 64-67, and wherein the means for performing the action as a function of the classification of the failure comprises means for using the out-of-band network to transmitting messages to a target sled via the resource manager server to bypass the other managed node.

What is claimed is:

1. A resource manager server for monitoring node cluster health, the resource manager server comprising:
a compute engine to:
receive, via an out-of-band network, health data from each of a plurality of sleds of a managed node of a node cluster that includes a plurality of managed nodes, wherein each of the plurality of managed nodes are communicatively coupled across a data network;
identify whether a sled of the managed node has indicated a failure;
determine a cause of the failure;
classify the failure as being one of a soft failure or a hard failure as a function of the received health data and the cause of the failure; and
transmit a health state change event to each of other managed nodes of the plurality of managed nodes of the node cluster.

2. The resource manager server of claim 1, wherein to receive the health data comprises to receive data usable to identify a health status of each of the sleds.

3. The resource manager server of claim 1, wherein to identify whether the sled has indicated the failure comprises to determine whether the sled has indicated one of a hardware failure, a software failure, or a runtime failure.

4. The resource manager server of claim 1, wherein to classify the failure as being the soft failure comprises to determine the cause of the failure as being temporary as a function of the received health data and the cause of the failure.

5. The resource manager server of claim 4, wherein to determine the cause of the failure as being temporary comprises to determine whether the failure is a result of congestion across the data network.

6. The resource manager server of claim 4, wherein to determine the cause of the failure as being temporary comprises to determine whether the failure is a result of scheduled maintenance being performed on the sled.

7. The resource manager server of claim 4, wherein to determine the cause of the failure as being temporary comprises to determine whether the failure is a result of the sled being rebooted.

8. The resource manager server of claim 1, wherein to classify the failure as being the hard failure comprises to determine the cause of the failure as being permanent as a function of the received health data and the cause of the failure.

9. The resource manager server of claim 8, wherein to determine the cause of the failure as being permanent comprises to determine whether the failure is a result of the sled being powered down.

10. The resource manager server of claim 1, wherein to transmit the health state change event comprises to transmit an indication of the failure as being one of the soft failure or the hard failure.

11. The resource manager server of claim 1, wherein the compute engine is further to:
receive, via the out-of-band network, a subscription request from another managed node of the plurality of managed nodes; and
add, in response to having received the subscription request, the another managed node as a subscriber,
wherein to transmit the health state change event to each of the other managed nodes of the plurality of managed nodes of the node cluster comprises to transmit the health state change event to the another managed node subsequent to having subscribed the another managed node as a subscriber to receive an indication of the health state change event.

12. The resource manager server of claim 1, wherein the sled comprises a circuit board with attached hardware components and wherein the hardware components comprise one or more of: compute, memory, accelerator, and/or storage.

13. One or more non-transitory machine-readable storage media comprising a plurality of instructions stored thereon that, in response to being executed, cause a resource manager server to:
receive, via an out-of-band network, health data from each of a plurality of sleds of a managed node of a node cluster that includes a plurality of managed nodes of the node cluster, wherein each of the plurality of managed nodes are communicatively coupled across a data network;
identify whether a sled of the managed node has indicated a failure;
determine a cause of the failure;
classify the failure as being one of a soft failure or a hard failure as a function of the received health data and the cause of the failure; and
transmit a health state change event to each of other managed nodes of the plurality of managed nodes of the node cluster.

14. The one or more machine-readable storage media of claim 13, wherein to receive the health data comprises to receive data usable to identify a health status of each of the sleds.

15. The one or more machine-readable storage media of claim 13, wherein to identify whether the sled has indicated the failure comprises to determine whether the sled has indicated one of a hardware failure, a software failure, or a runtime failure.

16. The one or more machine-readable storage media of claim 13, wherein to classify the failure as being the soft failure comprises to determine the cause of the failure as being temporary as a function of the received health data and the cause of the failure.

17. The one or more machine-readable storage media of claim 16, wherein to determine the cause of the failure as being temporary comprises to determine whether the failure is a result of congestion across the data network.

18. The one or more machine-readable storage media of claim 16, wherein to determine the cause of the failure as being temporary comprises to determine whether the failure is a result of scheduled maintenance being performed on the sled.

19. The one or more machine-readable storage media of claim 16, wherein to determine the cause of the failure as being temporary comprises to determine whether the failure is a result of the sled being rebooted.

20. The one or more machine-readable storage media of claim 13, wherein to classify the failure as being the hard failure comprises to determine the cause of the failure as being permanent as a function of the received health data and the cause of the failure.

21. The one or more machine-readable storage media of claim 20, wherein to determine the cause of the failure as being permanent comprises to determine whether the failure is a result of the sled being powered off completely.

22. The one or more machine-readable storage media of claim 13, wherein to transmit the health state change event comprises to transmit an indication of the failure as being one of the soft failure or the hard failure.

23. The one or more machine-readable storage media of claim 13, wherein the plurality of instructions further cause the resource manager server to:
receive, via the out-of-band network, a subscription request from another managed node of the plurality of managed nodes; and
add, in response to having received the subscription request, the another managed node as a subscriber,
wherein to transmit the health state change event to each of the other managed nodes of the plurality of managed nodes of the node cluster comprises to transmit the health state change event to the another managed node subsequent to having subscribed the another managed node as a subscriber to receive an indication of the health state change event.

24. The one or more machine-readable storage media of claim 13, wherein the sled comprises a circuit board with attached hardware components and wherein the hardware components comprise one or more of: compute, memory, accelerator, and/or storage.

25. A resource manager server comprising:
circuitry for receiving, by a resource manager server via an out-of-band network, health data from each of a plurality of managed nodes of a node cluster, wherein each of the plurality of managed nodes of the node cluster are communicatively coupled across a data network;
means for identifying, by the resource manager server, whether a sled of the managed node has indicated a failure;

means for determining, by the resource manager server, a cause of the failure;

means for classifying, by the resource manager server, the failure as being one of a soft failure or a hard failure as a function of the received health data and the cause of the failure; and circuitry for transmitting, by the resource manager server, a health state change event to each of other managed nodes of the plurality of managed nodes of the node cluster.

26. The resource manager server of claim 25, wherein the means for classifying the failure as being the soft failure comprises means for determining the cause of the failure as being temporary as a function of the received health data and the cause of the failure, and wherein the means for determining the cause of the failure as being temporary comprises means for determining whether the failure is a result of one of (i) congestion across the data network, (ii) scheduled maintenance being performed on the sled, or (iii) the sled being rebooted.

27. The resource manager server of claim 25, further comprising:

circuitry for receiving, by the resource manager server via the out-of-band network, a subscription request from another managed node of the plurality of managed nodes, wherein the subscription request includes information usable to identify one or more sleds of the another managed node; and means for adding, by the resource manager server and in response to having received the subscription request, the another managed node as a subscriber, wherein the circuitry for transmitting the health state change event to each of the another managed nodes of the plurality of managed nodes of the node cluster comprises circuitry for transmitting the health state change event to the another managed node subsequent to having subscribed the another managed node as a subscriber to receive an indication of the health state change event.

\* \* \* \* \*